(12) United States Patent
Mizuno

(10) Patent No.: US 10,355,258 B2
(45) Date of Patent: Jul. 16, 2019

(54) SEPARATOR FOR BATTERY

(71) Applicant: TORAY INDUSTRIES, INC., Tokyo (JP)

(72) Inventor: Naoki Mizuno, Nasushiobara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 211 days.

(21) Appl. No.: 15/322,798

(22) PCT Filed: Mar. 25, 2015

(86) PCT No.: PCT/JP2015/059065
§ 371 (c)(1),
(2) Date: May 1, 2017

(87) PCT Pub. No.: WO2015/156127
PCT Pub. Date: Oct. 15, 2015

(65) Prior Publication Data
US 2017/0229698 A1    Aug. 10, 2017

(30) Foreign Application Priority Data

Apr. 11, 2014 (JP) ................................. 2014-082047

(51) Int. Cl.
H01M 2/16 (2006.01)
H01M 10/05 (2010.01)
H01M 10/0525 (2010.01)

(52) U.S. Cl.
CPC ......... *H01M 2/1686* (2013.01); *H01M 2/166* (2013.01); *H01M 2/1653* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,426,165 B1 * | 7/2002 | Coustier | H01M 2/145 29/623.4 |
| 2007/0178384 A1 * | 8/2007 | Kajita | H01M 2/1653 429/251 |
| 2009/0111025 A1 | 4/2009 | Lee et al. | |
| 2011/0259505 A1 | 10/2011 | Lee et al. | |
| 2011/0268942 A1 * | 11/2011 | Rhee | B32B 27/32 428/213 |
| 2012/0070644 A1 | 3/2012 | Kang et al. | |
| 2012/0115009 A1 * | 5/2012 | Okuno | H01M 2/1646 429/145 |
| 2013/0011716 A1 * | 1/2013 | Sano | B32B 23/08 429/145 |
| 2013/0089771 A1 | 4/2013 | Nishikawa | |
| 2013/0095365 A1 | 4/2013 | Nishikawa | |
| 2013/0209861 A1 | 8/2013 | Yong et al. | |
| 2016/0285064 A1 * | 9/2016 | Hatta | H01M 2/166 |

FOREIGN PATENT DOCUMENTS

| | | |
|---|---|---|
| JP | 2001-266942 A | 9/2001 |
| JP | 2008-123996 A | 5/2008 |
| JP | 2008-524824 A | 7/2008 |
| JP | 2012-104422 A | 5/2012 |
| JP | 4988973 B1 | 8/2012 |
| JP | 2012-522669 A | 9/2012 |
| JP | 2013-506259 A | 2/2013 |
| JP | 2013-122009 A | 6/2013 |
| WO | 2011/114626 A1 | 9/2011 |
| WO | 2012/137376 A1 | 10/2012 |
| WO | 2013/133074 A1 | 9/2013 |

OTHER PUBLICATIONS

Liu, F. et at, "Progress in the Production and Modification of PVDF Membranes", Journal of Membrane Science, 2011, 375, pp. 1-27.
International Preliminary Report on Patentability (Form PCT/IB/373) issued in counterpart International Application No. PCT/JP2015/059065, dated Oct. 12, 2016, with Form PCT/ISA/237. (8 pages).
International Search Report dated May 19, 2015, issued in counterpart International Application No. PCT/JP2015/059065. (2 pages).
Extended (supplementary) European Search Report dated Mar. 8, 2018, issued in counterpart European Application No. 15776189.1. (8 pages).

* cited by examiner

*Primary Examiner* — Scott J. Chmielecki
(74) *Attorney, Agent, or Firm* — Westerman, Hattori, Daniels & Adrian, LLP

(57) ABSTRACT

A separator for batteries that achieves both adhesiveness to electrodes and low thermal shrinkage, which have been conventionally difficult to be compatible with each other, and has excellent ion permeability in order to further improve the safety of the separator, on the assumption that lithium ion secondary batteries are widely used for electric automobiles and the like, which require the batteries to withstand severe operating conditions. The separator for batteries is configured such that a modified porous layer containing a fluororesin and inorganic particles is laminated on at least one side of a porous membrane formed of a polyolefin resin. The content of the particles is equal to or more than 40% by volume and less than 70% volume with respect to the total of the fluororesin and the particles. The fluororesin has a crystallinity of equal to or more than 36% and less than 70%.

6 Claims, No Drawings

SEPARATOR FOR BATTERY

TECHNICAL FIELD

The present invention relates to a separator for batteries that includes a modified porous layer excellent in adhesiveness to electrodes, the separator being excellent in heat resistance. In particular, the present invention relates to a separator for batteries that is useful as a separator for lithium ion batteries.

BACKGROUND ART

Thermoplastic resin microporous membranes have been widely used, for example, as a material for separation, selective permeation, and isolation of substances: such as separators for batteries used in lithium ion secondary batteries, nickel-hydrogen batteries, nickel-cadmium batteries, and polymer batteries; separators for electric double layer capacitors; various filters such as a reverse osmosis filtration membrane, an ultrafiltration membrane, and a microfiltration membrane; moisture-permeable waterproof clothing; and medical materials. In particular, a polyethylene porous membrane has been suitably used as a separator for lithium ion secondary batteries, because such a porous membrane has ion permeability when impregnated with an electrolyte; is excellent in electrical insulation, electrolyte resistance, and oxidation resistance; and has such a pore-blocking effect that, at the time of abnormal temperature rise in a battery, an excessive temperature rise is suppressed by blocking a current at a temperature of approximately 120° C. to 150° C. However, when the temperature rise continues for some reason even after the pore blocking, membrane rupture sometimes occurs due to a decrease in the viscosity of a polyethylene constituting the membrane and in the shrinkage of the membrane. This phenomenon is not limited to a phenomenon that occurs when polyethylene is used. Also in the case of using other thermoplastic resins, this phenomenon is unavoidable at a temperature equal to or higher than the melting points of the resins.

Separators for lithium ion batteries are highly responsible for battery properties, battery productivity, and battery safety, and required to have, for example, excellent mechanical properties, heat resistance, permeability, dimensional stability, pore-blocking properties (shutdown properties), and melt rupture properties (meltdown properties). Furthermore, the separators are required to have improved adhesiveness to an electrode material for the purpose of improving cycle characteristics of a battery and required to have improved electrolyte permeability for the purpose of improving productivity. Therefore, various studies to laminate various modified porous layers to a porous membrane have been conducted until now. For the modified porous layer, polyamide-imide resin, polyimide resin, or aromatic polyamide resin, each having both heat resistance and electrolyte permeability, and fluororesin excellent in adhesiveness to electrodes are suitably used. Incidentally, the "modified porous layer" used herein means a porous layer that has at least adhesiveness to an electrode material and the effect of inhibiting thermal shrinkage (heat resistance).

Fluororesin is a resin relatively excellent in adhesiveness to electrodes, but, a porous layer formed of a fluororesin has higher thermal shrinkage than porous layers formed of a polyamide imide resin, a polyimide resin, and an aromatic polyamide resin, and has a lower level of safety when incorporated into a lithium ion battery. To improve such heat resistance, a method of adding inorganic particles or organic particles has been proposed, but, such a method causes a decrease in an important required property, namely, adhesiveness to electrodes. In other words, it has been extremely difficult to achieve both adhesiveness to electrodes and heat resistance.

Furthermore, in a battery that is expected to be used for electric automobiles and the like, which require the battery to withstand severe operating conditions, it is expected that not only the safety is increasingly ensured, but also, with lower costs and higher capacity, a separator is further made thinner to increase an area capable of being filled in a container of the battery.

Examples of Patent Literature 1 disclose an organic-inorganic composite porous separator membrane having thermal stability and excellent ion permeability. The separator membrane is obtained by applying an acetone solution of a mixture of inorganic particles and a binder formed of a copolymer including polyvinylidene fluoride (inorganic particles/binder=90/10 (% by weight) onto a polyethylene separator membrane.

Patent Literature 2 discloses a separator for nonaqueous secondary batteries in which an adhesive porous layer formed in at least one side of a porous base material, formed of a polyvinylidene fluoride resin, and having a crystallinity of 20% to 35% is laminated. In examples of Patent Literature 2, a separator for nonaqueous secondary batteries including a laminated adhesive porous layer and achieving both ion permeability and adhesiveness to electrodes is obtained by applying a dimethyl acetamide/tripropylene glycol mixed solvent solution of a polyvinylidene fluoride resin to both sides of a polyethylene microporous membrane, and immersing the coated membrane in a coagulation liquid to coagulate, followed by water-washing and drying.

Patent Literature 3 discloses a separator for nonaqueous electrolyte batteries in which a heat resistant porous layer containing equal to or more than 70% by volume of heat resistant particles is formed on a surface of a resin porous membrane. Specifically, in Example 1, a mixed solution obtained by adding alumina powder: 3,000 g to a solution in which N-methyl-2-pyrrolidone (NMP): 1,000 g is dissolved in an NMP solution of PVDF (having a solid content of 15% by mass): 600 g is applied onto a polyethylene porous membrane, and dried, whereby a separator for nonaqueous electrolyte batteries with excellent dimensional stability at high temperature is obtained.

Examples of Patent Literature 4 disclose a separator formed of two laminated layers of a porous organic-inorganic composite internal layer and a porous polymer outer layer and having good adhesiveness to electrodes, the separator being obtained in such a manner that a slurry containing a mixture of inorganic particles, a binder formed of a polyvinylidene fluoride copolymer, and acetone, and a slurry including only the above-mentioned binder and acetone are applied onto a polyethylene porous membrane, and dried simultaneously.

Any of the separators disclosed in Patent Literatures 1 to 4 is a separator in which a modified porous layer including a PVDF resin having an adhesive function to electrodes, or including the PVDF resin and heat resistant particles is laminated on a polyolefin porous membrane. Generally, to improve adhesiveness to electrodes, the ratio of a resin having an adhesive function to electrodes, such as PVDF, in a modified porous layer is made higher. For example, ultimately, a modified porous layer including only the above-mentioned resin is ideally used. However, in this case, the effect of inhibiting thermal shrinkage is decreased, whereby sometimes the safety cannot be ensured when the separator is incorporated into a nonaqueous secondary battery. By contrast, when the ratio of the heat resistant particles is made higher, the effect of inhibiting thermal shrinkage is increased, but adhesiveness to electrodes is decreased. In other words, the fact is that, only with the adjustment of the two ratios, satisfactory adhesiveness to electrodes and a satisfactory effect of inhibiting thermal shrinkage cannot be fully achieved.

Furthermore, as nonaqueous secondary batteries have increased in performance in recent years, a separator is required to have higher ion permeability. However, when a modified porous layer is laminated on a polyolefin porous membrane, ion permeability with which the polyolefin porous membrane is originally equipped is inevitably deteriorated to some extent. Although there is a method of laminating a modified porous layer on a polyolefin porous membrane beforehand having low air permeation resistance, in other words, high porosity, the polyolefin porous membrane having high porosity has low mechanical strength, and therefore, such a method cannot be suitable for requirements for high-speed processing and a thinner separator, the requirements being associated with a reduction in cost and an increase in capacity which will rapidly proceed in the future.

In other words, there was not present a separator for batteries that achieves adhesiveness to electrodes and the effect of inhibiting thermal shrinkage (heat resistance) and suppresses the extent of increase in air permeation resistance due to the lamination of a modified porous layer.

CITATION LIST

Patent Literature

[Patent Literature 1] Japanese Translation of PCT Application No. 2008-524824
[Patent Literature 2] Japanese Patent No. 4988973
[Patent Literature 3] Japanese Unexamined Patent Application Publication No. 2008-123996
[Patent Literature 4] Japanese Translation of PCT Application No. 2013-506259

SUMMARY OF INVENTION

Technical Problem

The present inventors aim to provide a separator for batteries that achieves both adhesiveness to electrodes and low thermal shrinkage, which have been conventionally difficult to be compatible with each other, and has excellent ion permeability in order to further improve the safety of the separator, on the assumption that lithium ion secondary batteries are widely used for electric automobiles and the like, which require the batteries to withstand severe operating conditions.

Solution to Problem

The present invention provides a separator obtained by laminating a modified porous layer on a porous membrane formed of a polyolefin resin, in which the modified porous layer includes a specific fluororesin and inorganic particles at an optimal ratio thereof, and furthermore, the crystallinity of the fluororesin is controlled by a special control technique. This allows the separator according to the present invention to achieve both adhesiveness to electrodes and low thermal shrinkage.

The adhesiveness to electrodes and the thermal shrinkage are preferably in the following respective ranges when evaluated by a later-mentioned method. The adhesiveness to electrodes is preferably equal to or more than 200 mN/10 mm, more preferably equal to or more than 250 mN/10 mm, and still more preferably equal to or more than 300 mN/10 mm. The thermal shrinkage is preferably equal to or less than 15%, more preferably equal to or less than 13%, and still more preferably equal to or less than 12%. When the adhesiveness to electrodes and the thermal shrinkage are in the above-mentioned respective preferred ranges, safety is easily maintained when the separator is incorporated into a battery.

To solve the above-mentioned problems, the separator for batteries according to the present invention is configured as follows.

The separator for batteries is such that a modified porous layer containing a fluororesin and inorganic particles is laminated on at least one side of a porous membrane formed of a polyolefin resin, in which the content of the particles is equal to or more than 40% by volume and less than 70% by volume with respect to the total of the fluororesin and the particles, and the crystallinity of the fluororesin is equal to or more than 36% and less than 70%.

In a preferred aspect of the separator for batteries according to the present invention, the separator for batteries preferably satisfies Formula 1:

$$20 \leq Y-X \leq 100 \qquad \text{Formula (1)}$$

where X is an air permeation resistance of the porous membrane (sec/100 cc Air), and
Y is an air permeation resistance of the whole of the separator for batteries (sec/100 cc Air).

In the separator for batteries according to the present invention, the above-mentioned polyolefin porous membrane preferably has a thickness of not more than 25 um.

In the separator for batteries according to the present invention, the above-mentioned inorganic particles preferably include at least one selected from the group consisting of alumina, titania, and boehmite.

The separator for batteries according to the present invention is preferably used as a separator for lithium ion secondary batteries.

Effects of the Invention

According to the present invention, a separator for batteries that achieves both adhesiveness to electrodes and low thermal shrinkage and has excellent ion permeability is obtained.

DESCRIPTION OF EMBODIMENTS

The present invention provides a separator for batteries that is obtained by laminating a modified porous layer on a polyolefin porous membrane, in which the modified porous layer contains a fluororesin having a specific molecular weight and particles at a specific ratio, and furthermore, by controlling the crystallinity of the fluororesin with an advanced processing technique, the separator for batteries is equipped with excellent adhesiveness to electrodes, excellent heat resistance, and ion permeability.

The summary of a layered porous membrane including at least a polyolefin porous membrane and a modified porous layer according to the present invention and the layered porous membrane to be used as a separator for batteries will be given, but the present invention is, of course, not limited to this representative example.

First, the polyolefin porous membrane according to the present invention will be described.

The upper limit of the thickness of the polyolefin porous membrane according to the present invention is preferably 25 µm, more preferably 20 µm, and still more preferably 16 µm. The lower limit is preferably 7 µm, and more preferably 9 µm. When the thickness of the polyolefin porous membrane is in the above-mentioned preferred range, the membrane can have practical membrane strength and a practical pore-blocking effect, and the area per unit volume of a battery case is not restricted, which is suitable for an increase in battery capacity which is expected to proceed in the future.

The upper limit of the air permeation resistance of the polyolefin porous membrane is preferably 300 sec/100 cc Air, more preferably 200 sec/100 cc Air, and still more preferably 150 sec/100 cc Air, and the lower limit thereof is preferably 50 sec/100 cc Air, more preferably 70 sec/100 cc Air, and still more preferably 100 sec/100 cc Air.

The upper limit of the porosity of the polyolefin porous membrane is preferably 70%, more preferably 60%, and still more preferably 55%, and the lower limit thereof is preferably 30%, more preferably 35%, and still more preferably 40%. When the air permeation resistance and porosity of the polyolefin porous membrane are in the above-mentioned preferred ranges, in the case where the polyolefin porous membrane is used as a separator for batteries, a battery can fully exert its functions in charge and discharge properties of the battery, particularly, ion permeability (charge and discharge operating voltage), and the lifetime of the battery (closely related to the amount of an electrolyte retained). Furthermore, the polyolefin porous membrane can have sufficient mechanical strength and insulation properties, whereby the possibility of a short circuit during charge and discharge in a battery including this polyolefin porous membrane decreases.

The average pore diameter of the polyolefin porous membrane has a great influence on pore-blocking performance, and is therefore preferably 0.01 µm to 1.0 µm, more preferably 0.05 µm to 0.5 µm, and still more preferably 0.1 µm to 0.3 µm. When the average pore diameter of the polyolefin porous membrane is in the above-mentioned preferred range, the anchor effect of the functional resin provides appropriate peel strength between the polyolefin porous membrane and the modified porous layer. Furthermore, at the time of the lamination of the modified porous layer, the air permeation resistance of the polyolefin porous membrane does not significantly deteriorate; a slow shutdown response at a pore-blocking temperature of the polyolefin porous membrane is not caused; and the pore-blocking temperature does not shift to the higher temperature side.

As a polyolefin resin constituting the polyolefin porous membrane, polyethylene and polypropylene are preferably used. Furthermore, the polyolefin resin constituting the polyolefin porous membrane may be a single substance or a mixture of two or more different polyolefin resins, for example, a mixture of polyethylene and polypropylene, or a copolymer of different olefins. The polyolefin porous membrane formed of the above-mentioned resins has not only basic properties such as electrical insulating properties and ion permeability, but also a pore-blocking effect of blocking a current in abnormal temperature rise of a battery to suppress an excessive temperature rise.

In particular, polyethylene is excellent in terms of pore-blocking performance, and therefore preferable. A detailed description will be given below while taking polyethylene as an example of the polyolefin resin used in the present invention.

Examples of polyethylene include ultrahigh molecular weight polyethylene, high density polyethylene, medium density polyethylene, and low density polyethylene.

Furthermore, examples of a polymerization catalyst include, but are not limited to, Ziegler-Natta catalysts, Phillips catalysts, and metallocene catalysts. These polyethylenes may be not only a homopolymer of ethylene, but also a copolymer containing a small amount of any other α-olefin. Examples of suitable α-olefins other than ethylene include propylene, 1-butene, 1-pentene, 1-hexene, 4-methyl-1-pentene, 1-octene, (meth)acrylic acid, esters of (meth)acrylic acid, and styrene. The polyethylene may a single substance, but is preferably a mixture of two or more polyethylenes. As the polyethylene mixture, a mixture of two or more ultrahigh molecular weight polyethylenes having different weight average molecular weights (Mw), or a similar mixture of two or more high density polyethylenes, medium density polyethylenes, or low density polyethylenes may be used, or a mixture of two or more polyethylenes selected from the group consisting of ultrahigh molecular weight polyethylenes, high density polyethylenes, medium density polyethylenes, and low density polyethylenes may be used.

In particular, a preferred polyethylene mixture is a mixture of an ultrahigh molecular weight polyethylene having an Mw of not less than $5 \times 10^5$ and a polyethylene having an Mw of not less than $1 \times 10^4$ and less than $5 \times 10^5$. The Mw of the ultrahigh molecular weight polyethylene is preferably $5 \times 10^5$ to $1 \times 10^7$, and more preferably $1 \times 10^6$ to $5 \times 10^6$. As the polyethylene having an Mw of not less than $1 \times 10^4$ and less than $5 \times 10^5$, any of a high density polyethylene, a medium density polyethylene, and a low density polyethylene may be used, and in particular, a high density polyethylene is preferably used. As the polyethylene having an Mw of not less than $1 \times 10^4$ and less than $5 \times 10^5$, two or more polyethylenes having different Mws may be used, or two or more polyethylenes having different densities may be used. When the upper limit of the Mw of the polyethylene mixture is not more than $15 \times 10^6$, melt extrusion can be easily carried out.

In the present invention, the upper limit of the content of the ultrahigh molecular weight polyethylene is preferably 40% by weight, more preferably 30% by weight, and still more preferably 10% by weight, and the lower limit thereof is preferably 1% by weight, more preferably 2% by weight, and still more preferably 5% by weight. When the content of the ultrahigh molecular weight polyethylene is in the above-mentioned preferred range, even in the case of further reducing the thickness of the polyethylene porous membrane, sufficient tensile strength is provided. Note that the tensile strength is preferably equal to or more than 100 MPa. The upper limit of the tensile strength is not particularly determined.

The molecular weight distribution (Mw/Mn) of the polyethylene resin, which is the ratio of the weight average molecular weight (Mw) to the number average molecular weight (Mn), is in a range of preferably 5 to 200, and more preferably 10 to 100. When the ratio Mw/Mn is in the above-mentioned preferred range, a polyethylene resin solution can be easily extruded, and, in the case of further reducing the thickness of the polyethylene porous membrane, sufficient mechanical strength is provided. The ratio Mw/Mn is used as an index of molecular weight distribution. A larger ratio for a polyethylene formed of a single substance means a wider molecular weight distribution. The ratio Mw/Mn of a polyethylene formed of a single substance can be appropriately adjusted by means of multistage polymerization of the polyethylene. The ratio Mw/Mn of a mixture of polyethylenes can be appropriately adjusted by adjusting the molecular weights and the mixing ratio of components.

As long as the above-mentioned various features are satisfied, a method of producing the polyethylene porous membrane can be freely chosen according to a purpose. Examples of the method of producing the porous membrane include a foaming process, a phase separation process, a melting and recrystallization process, a stretching pore-forming process, and a powder sintering process. Among these processes, a phase separation process is preferable in terms of homogenization of micropores and costs.

Examples of the production method using a phase separation process include a method in which, for example, polyethylene and a membrane-forming solvent are heated, melted, and kneaded; the resulting molten mixture is extruded through a die; the extrudate is cooled to form a gel-like product; the resulting gel-like product is stretched in at least one axis direction; and the membrane-forming solvent is removed to obtain a porous membrane.

The polyethylene porous membrane may be a monolayer membrane or may have a layer structure including two or more layers that differ in molecular weight or average pore diameter. A multilayer membrane including two or more layers can be produced by either a method in which, for example, a polyethylene constituting Layer a and a polyethylene constituting Layer b are each melted and kneaded with a membrane-forming solvent, and the resulting molten mixtures are fed from the respective extruders to a single die to integrate and coextrude gel sheets constituting the respective components; or a method in which the gel sheets constituting the layers are laminated and heat-fused. The co-extrusion method is preferable because the method allows high interlayer adhesive strength to be easily provided; allows continuous pores to be easily formed between layers, thereby allowing high permeability to be easily maintained; and leads to excellent productivity. In the case of a layer structure including two or more layers, the molecular weight and molecular weight distribution of the polyethylene resin of at least one of the outermost layers are preferably in the above-mentioned ranges.

The polyethylene porous membrane needs to have the effect of blocking pores at the time of an abnormal charge and discharge reaction. Therefore, the melting point (softening point) of the constituent resin is preferably 70° C. to 150° C., more preferably 80° C. to 140° C., and still more preferably 100° C. to 130° C. The melting point of the constituent resin within the above-mentioned preferred range can activate the pore-blocking effect in normal use, which prevents the case of inhibiting the use of the battery, and can activate the pore-blocking effect at the time of an abnormal reaction, which ensures safety.

Next, the modified porous layer used in the present invention will be described.

The crystallinity of the fluororesin in the modified porous layer according to the present invention is preferably equal to or more than 36% and less than 70%. The lower limit of the crystallinity is more preferably equal to or more than 40%, and still more preferably equal to or more than 45%, and the upper limit of the crystallinity is more preferably equal to or less than 65%, and still more preferably equal to or less than 60%. When the crystallinity is in the above-mentioned preferred range, excellent heat resistance and excellent adhesiveness to electrodes are provided.

The fluororesin used in the present invention is not limited to a particular fluororesin as long as the fluororesin is capable of improving adhesiveness to electrodes, heat resistance, and electrolyte permeability, but, in terms of heat resistance and adhesiveness to electrodes, it is preferable to use at least one selected from the group consisting of a vinylidene fluoride homopolymer, a vinylidene fluoride/fluorinated olefin copolymer, a vinyl fluoride homopolymer, and a vinyl fluoride/fluorinated olefin copolymer. A polyvinylidene fluoride resin and a polyvinylidene fluoride-hexafluoro propylene copolymer are particularly preferred. These polymers have adhesiveness to electrodes, a high affinity for a nonaqueous electrolyte, and high chemical and physical stabilities to a nonaqueous electrolyte, and therefore can sufficiently maintain affinity for an electrolyte even when used at high temperature.

The molecular weight of a polyvinylidene fluoride resin is an important factor in controlling the crystallinity. The lower limit of the molecular weight is, in terms of weight-average molecular weight (Mw), preferably $0.9 \times 10^6$, more preferably $1.0 \times 10^6$, and still more preferably $1.1 \times 10^6$, and the upper limit thereof is preferably $2.0 \times 10^6$, more preferably $1.5 \times 10^6$, and still more preferably $1.4 \times 10^6$. When the molecular weight is in this range, the crystallinity of the polyvinylidene fluoride resin is easily controlled to be in the above-mentioned range. As the polyvinylidene fluoride resin, a commercially-available resin may be used. Examples of the commercially-available polyvinylidene fluoride resin include KF polymer W #7300 and KF polymer W #9300 (manufactured by KUREHA CORPORATION).

Examples of the inorganic particles include calcium carbonate, calcium phosphate, amorphous silica, crystalline glass filler, kaolin, talc, titanium dioxide, alumina, silica-alumina composite oxide particles, barium sulfate, calcium fluoride, lithium fluoride, zeolite, molybdenum sulfide, mica, and boehmite. In particular, titanium dioxide, alumina, and boehmite are suitable in terms of the crystal growth of a fluororesin, costs, and availability.

The modified porous layer according to the present invention contains at least the fluororesin and the inorganic particles. The inorganic particle content of the modified porous layer with respect to the total of the fluororesin and the inorganic particles is preferably equal to or more than 40% by volume, more preferably equal to or more than 45% by volume, and still more preferably not equal to or more 50% by volume; and preferably less than 70% by volume, more preferably equal to or less than 65% by volume, and still more preferably equal to or less than 60% by volume. When the inorganic particle content is in the above-mentioned preferred range, a good balance of adhesiveness to electrodes, heat resistance, and the extent of increase in air permeation resistance is easily achieved.

The average particle diameter of the inorganic particles is preferably equal to or more than 1.5 times and equal to or less than 50 times, and more preferably equal to or more than 2.0 times and equal to or less than 20 times the average pore diameter of the polyolefin porous membrane. When the average particle diameter of the particles is in the above-mentioned preferred range, air permeation resistance is maintained without blocking up pores of the polyolefin porous membrane in a state where the heat resistant resin and the particles are intermingled. Furthermore, the falling-off of above-mentioned particles during a battery assembly process and serious defects in a battery can be prevented.

Examples of the shape of the particles include a spherical shape, an approximately globular shape, a plate shape, and a needle shape, but the shape of the particles is not limited to a particular shape.

The thickness of the modified porous layer is preferably 1 µm to 5 µm, more preferably 1 µm to 4 µm, and still more preferably 1 µm to 3 µm. When the thickness is not less than 1 µm, adhesiveness to electrodes is ensured; the polyolefin microporous membrane is prevented from melting and shrinking at its melting point or higher; and membrane strength and insulating properties can be ensured. When the thickness is not more than 5 µm, the winding volume of the modified porous layer can be kept small, which is suitable for a future-expected increase in battery capacity. Furthermore, curling is prevented from becoming large, and this leads to a productivity improvement in a battery assembly process. Furthermore, the optimization of the occupation of the polyolefin microporous membrane allows a sufficient pore-blocking effect to be achieved, thereby preventing an abnormal reaction.

The porosity of the modified porous layer is preferably 30% to 90%, and more preferably 40% to 70%. When the porosity is not less than 30%, an increase in the electrical resistance of the membrane is prevented, thereby allowing a high current to flow. When the porosity is not more than 90%, the membrane strength can be maintained.

The upper limit of the thickness of the whole of the separator for batteries obtained by laminating the modified porous layer is preferably 30 µm, and more preferably 25 µm, and the lower limit thereof is preferably 5 µm, and more preferably 7 µm. When the thickness is not less than the lower limit in the above-mentioned preferred range, sufficient mechanical strength and insulating properties can be ensured. When the thickness is not more than the upper limit in the above-mentioned preferred range, the area of an electrode allowed to be loaded into a container can be secured, and accordingly, a decrease in capacity can be avoided.

A method of laminating the modified porous layer will be described. The modified porous layer is obtained in such a manner that a varnish mainly formed of the particles and a fluororesin solution obtained by dissolving a fluororesin in a solvent capable of dissolving the fluororesin and miscible with water is laminated on the above-obtained polyolefin fine porous membrane by making use of a coating process, and subsequently, the laminate is placed under a specific moist environment to cause phase separation between the fluororesin and the solvent miscible with water, and furthermore, is fed into a water bath (coagulation bath) to coagulate the fluororesin.

Examples of the coating process of the varnish include dip coating, reverse roll coating, gravure coating, kiss coating, roll brushing, spray coating, air knife coating, Meyer bar coating, pipe doctor method, blade coating, and die coating, and these processes can be used alone or in combination. Furthermore, it is important that the varnish be sealed off and stored until the coating application so as to be exposed to the outside air as little as possible.

In the present invention, in order to achieve a crystallinity of the fluororesin in the modified porous layer of equal to or more than 36% and less than 70%, it is important not only to use the above-mentioned fluororesin, but also to place the coated membrane under a specific moist environment for a specified time after the coating application, thereby, while causing phase separation, accelerating crystallization by using the inorganic particles as nuclei. The expression "under a moist environment" used in this specification does not mean just "under a high humidity environment", but means "passing through a zone filled with particulate waterdrops (hereinafter, sometimes simply referred to as a moist zone)". The particulate waterdrops preferably have a particle diameter of 50 µm to 500 µm. The particle diameter of the waterdrops can be determined by a well-known laser method. A state filled with the particulate waterdrops means a state in which a black ring having a width of 1 cm and an inner diameter of 5 cm arranged at a distance of 30 cm cannot be visually confirmed. The particulate waterdrops can be obtained by supplying compressed air and water from a gas-liquid mixing type two-fluid nozzle. Although depending on the volume of the moist zone, when the amount of water supplied is approximately 2 to 5 L/hr per $m^3$, the above-mentioned filled-up state can be made.

The time of passing through the moist zone is not less than 1 second, preferably not shorter than 2 seconds, and more preferably not shorter than 3 seconds. While the upper limit is not limited to a particular time, 10 seconds are sufficient for the passage. The time after passing through the above-mentioned zone and before reaching the entrance of the coagulation bath is preferably not shorter than 0.5 second and not longer than 10 seconds. This allows the crystallinity to be increased not only in the surface of the coating but also the depths of the coating. Note that an air current sprayed from the two-fluid nozzle is preferably arranged so as not to come into direct contact with the coated surface. This is because that, when an air current comes into direct contact with the coated surface, the extent of increase in air permeation resistance is sometimes larger.

In the coagulation bath, the fluororesin component and the particles coagulate into a three-dimensional network. The immersion time in the coagulation bath is preferably not shorter than 3 seconds. When the immersion time is shorter than 3 seconds, the coagulation of the resin component sometimes does not sufficiently proceed. Although the upper limit is not limited to a particular time, 10 seconds are sufficient for the immersion.

Furthermore, the above-mentioned unwashed microporous membrane is immersed in an aqueous solution containing a good solvent for the fluororesin constituting the modified porous membrane in an amount of 1% to 20% by weight, more preferably 5% to 15% by weight, and the resulting membrane is subjected to a washing process using pure water and a drying process using hot air at 100° C. or lower, whereby a final separator for batteries can be obtained.

For the washing to remove the solvent, common methods such as warming, ultrasonic irradiation, and bubbling may be used. Furthermore, to keep the concentration in each bath constant and increase washing efficiency, a method for removing a solution inside the microporous membrane between the baths is effective. Specific examples of the method include a method of extruding the solution inside the microporous layer with air or inert gas and a method of squeezing out the solution inside the membrane physically with a guide roll.

The separator for batteries according to the present invention is desirably stored dry, but when it is difficult to store the separator absolutely dry, it is preferable to perform a vacuum drying treatment at 100° C. or lower immediately before use.

The separator for batteries according to the present invention may be used as a separator for, for example, secondary batteries such as a nickel-hydrogen battery, a nickel-cadmium battery, a nickel-zinc battery, a silver-zinc battery, a lithium ion secondary battery, and a lithium polymer secondary battery. In particular, the separator for batteries according to the present invention is preferably used as a separator for lithium ion secondary batteries.

The porosity of the modified porous layer is preferably 30% to 90%, and more preferably 40% to 70%. The desired porosity is obtained by suitably adjusting, for example, the concentration of the inorganic particles or the concentration of a binder. When the porosity of the modified porous layer is in the above-mentioned preferred range, the layered porous membrane obtained by laminating the modified porous layer has a low electrical resistance of the membrane, allows a high current to easily flow, and maintains the membrane strength.

Air permeation resistance of the separator for batteries, which is one of the most important properties, is preferably 50 to 600 sec/100 cc Air, more preferably 100 to 500 sec/100 cc Air, and still more preferably 100 to 400 sec/100 cc Air. The desired air permeation resistance is obtained by adjusting the porosity of the modified porous layer and adjusting the degree of impregnation of the polyolefin porous membrane with a binder. When the air permeation resistance of the separator for batteries is in the above-mentioned preferred range, sufficient insulation properties are obtained, and clogging of foreign substances, short circuit, and membrane rupture are prevented. Furthermore, when the membrane resistance is kept low, charge and discharge properties and lifetime properties in a practically usable range are obtained.

The extent of increase in air permeation resistance means a difference in air permeation resistance between the polyolefin porous membrane and the layered porous membrane in which the modified porous layer is laminated. In other words, the extent of increase in air permeation resistance is a difference (Y−X) between the air permeation resistance of the polyolefin porous membrane (X sec/100 cc Air) and the air permeation resistance of the separator for batteries (Y sec/100 cc Air), and is preferably 20 sec/100 cc Air≤Y−X≤100 sec/100 cc Air. When the extent of increase in air permeation resistance is in this range, sufficient adhesiveness and good ion permeability are achieved. The extent of increase in air permeation resistance is more preferably 20 sec/100 cc Air≤Y−X≤80 sec/100 cc Air, and still more preferably 20 sec/100 cc Air≤Y−X≤50 sec/100 cc Air.

EXAMPLES

Hereinafter, the present invention will be specifically described with reference to examples, but the present invention is not limited to the examples. Note that measured values in the examples were determined by the following methods.

1. Adhesiveness to Electrodes (Peel Strength)

A positive electrode was produced as follows. To 94 parts by mass of a lithium-containing composite oxide, namely, $LiCoMgO_2$ (positive electrode active material), 3 parts by mass of carbon black was added as a conductive aid, and mixed. To the resulting mixture, an NMP solution containing 3 parts by mass of a polyvinylidene fluoride having a weight average molecular weight of 280,000 (KF polymer W #1100, manufactured by KUREHA CORPORATION) was added, and mixed to form a positive electrode mixture-containing slurry. This positive electrode mixture-containing slurry was uniformly applied to both sides of a positive electrode collector formed of aluminum foil having a thickness of 15 μm, and dried, and subsequently subjected to compression molding using a roll press machine to attain a total thickness of 100 μm and thus produce a positive electrode.

The positive electrode and the separator for batteries were each cut to a size of 2 cm×20 cm. Subsequently, a surface of the modified porous layer of the separator for batteries is sufficiently impregnated with propylene carbonate, and an active material surface of the positive electrode was bonded to the modified porous layer surface of the separator for batteries, and pressed at a pressure of 1 MPa for 6 minutes with the temperature of the mating surfaces kept at 100° C.

After that, the peel strength between the positive electrode and the separator for batteries was measured by a peeling method (peeling rate: 100 mm/min, 180° peeling) using a tensile tester ("Tensilon®-100" manufactured by A & D Company, Limited) under the conditions of 23° C. and 50% RH. Measurements were sequentially conducted over a span of 100 mm from the start to the end of the measurements, and an average value of the measurements was calculated and converted to a value per 10 mm width, then, the resulting value was used as peeling strength. Note that, at the above-mentioned peel interface, a part of the modified porous membrane sometimes remained on the polyolefin porous membrane, but also in this case, the average of measured values was calculated as peel strength between the positive electrode and the separator for batteries.

2. Crystallinity

Modified porous layers of separators for batteries obtained in Examples and Comparative Examples were scraped using a single-edged razor, and fixed onto a Si nonreflective plate with a collodion-ethanol solution.

Measurement Conditions are Shown Below.

Minute Part X-Ray Diffraction Method

| | |
|---|---|
| X-ray source | CuKα rays |
| Output power | 50 kV, 22 mA |
| Slit | 1.0 mm pinhole |
| Detector | two-dimensional PSPC |
| Camera length | approximately 15 cm |
| Measurement range center | 2θ = 25° |
| Elapsed time | 30 min/1 frame |

3. Air Permeation Resistance

Using a Gurley densometer type B manufactured by TESTER SANGYO CO., LTD., the polyolefin porous membrane or the separator for batteries was fixed between a clamping plate and an adapter plate such that wrinkling did not occur. Measurements were made at arbitrary 5 points in accordance with JIS P8117, and the average of the measured values was used as an air permeation resistance [sec/100 cc Air].

The extent of increase in air permeation resistance was determined using the following formula.

Extent of increase in air permeation resistance: Y−X where X is an air permeation resistance (sec/100 cc Air) of the polyolefin porous membrane, and Y is an air permeation resistance (sec/100 cc Air) of the whole of the separator for batteries.

4. Thermal Shrinkage

The heat resistances of the polyolefin porous membrane and the separator for batteries were determined from the average of the rate of dimensional change in MD and TD with respect to the initial dimension when the polyolefin porous membrane and the separator for batteries were stored in a 130° C. oven for 60 minutes.

5. Thickness

Using a contact-type thickness meter, ("Litematic" (registered trademark) series 318, manufactured by Mitutoyo Corporation), thickness was determined by averaging the values measured at 20 points. The measurements were made using a ϕ9.5 mm ultra-hard ball surface probe under the condition of a load at 0.01 N.

Example 1

(Preparation of Varnish)

As a fluororesin, a polyvinylidene fluoride-hexafluoro propylene copolymer (VdF/HFP=92/8 (weight ratio)) (having a weight average molecular weight of 1,000,000) was used. The fluororesin, alumina particles having an average diameter of 0.5 μm, and N-methyl-2-pyrrolidone were mixed so that the content of the alumina particles was 52% by volume with respect to the total of the fluororesin and the alumina particles and the solid concentration was 17% by weight, and the resin component was completely dissolved. Subsequently, the resulting mixture was placed into a polypropylene container together with zirconium oxide beads ("Torayceram" (registered trademark) beads, manufactured by TORAY INDUSTRIES, INC. and having a diameter of 0.5 mm), and dispersed for 6 hours using a paint shaker (manufactured by Toyo Seiki Seisaku-Sho, Ltd.). Next, the resulting dispersion was filtered through a filter with a filtration limit of 5 μm to prepare a varnish (a). The varnish was sealed off and stored until the coating so as to be exposed to the outside air as little as possible.

(Lamination of Modified Porous Layer)

The varnish (a) was applied to both sides of a polyethylene microporous membrane (having a thickness of 9 μm and an air permeation resistance of 240 sec/100 cc Air). Then, the coated membrane was passed through a moist zone filled with particulate waterdrops at a temperature of 25° C. for 2 seconds, and subsequently, after a lapse of 0.5 second, the membrane was placed into an aqueous solution (a coagulation bath) for 3 seconds, and washed with pure water, and then passed through a hot-air drying furnace at 70° C. to be dried, whereby a separator for batteries having a final thickness of 13 μm was obtained.

Example 2

A separator for batteries was obtained in the same manner as in Example 1, except that a varnish (b) was used, prepared by mixing the fluororesin, alumina particles having an average diameter of 0.5 μm, and N-methyl-2-pyrrolidone so that the content of the alumina particles was 43% by volume with respect to the total of the fluororesin and the alumina particles and the solid concentration was 16% by weight.

Example 3

A separator for batteries was obtained in the same manner as in Example 1, except that a varnish (c) was used, prepared by mixing the fluororesin, alumina particles having an average diameter of 0.5 μm, and N-methyl-2-pyrrolidone so that the content of the alumina particles was 66% by volume with respect to the total of the fluororesin and the alumina particles and the solid concentration was 16% by weight.

Example 4

A separator for batteries was obtained in the same manner as in Example 1, except that a varnish (d) was used, prepared by using a homopolymer of polyvinylidene fluoride, namely, KF polymer W #7300 (manufactured by KUREHA CORPORATION) in place of the fluororesin.

Example 5

A separator for batteries was obtained in the same manner as in Example 1, except that a varnish (e) was used, prepared by using a modified polymer of polyvinylidene fluoride, namely, KF polymer W #9300 (manufactured by KUREHA CORPORATION) in place of the fluororesin.

Example 6

A separator for batteries was obtained in the same manner as in Example 1, except that a varnish (f) was used, prepared by using titanium dioxide particles having an average particle diameter of 0.38 μm in place of the alumina particles.

Example 7

A separator for batteries was obtained in the same manner as in Example 1, except that a coating solution (g) was used, prepared by using tabular boehmite particles (having an average particle diameter of 1.0 μm) in place of the alumina particles.

Example 8

A separator for batteries was obtained in the same manner as in Example 1, except that a polyethylene microporous membrane (having a thickness of 16 μm and an air permeation resistance of 117 sec/100 cc Air) was used as the polyolefin microporous membrane.

Example 9

A separator for batteries was obtained in the same manner as in Example 1, except that a polyethylene microporous membrane (having a thickness of 20 μm and an air permeation resistance of 100 sec/100 cc Air) was used as the polyolefin microporous membrane.

Example 10

A separator for batteries was obtained in the same manner as in Example 1, except that a polyethylene microporous membrane (having a thickness of 7 μm and an air permeation resistance of 248 sec/100 cc Air) was used as the polyolefin microporous membrane.

Example 11

A separator for batteries was obtained in the same manner as in Example 1, except that the time of passing through the moist zone was 1.5 seconds and that the time of passing from the exit of the moist zone to the entrance to the coagulation bath was 0.4 second.

Example 12

A separator for batteries was obtained in the same manner as in Example 1, except that the time of passing through the moist zone was 3.0 seconds and that the time of passing from the exit of the moist zone to the entrance to the coagulation bath was 0.8 second.

Comparative Example 1

A separator for batteries was obtained in the same manner as in Example 1, except that the coated microporous membrane was directly placed into the coagulation bath without being passed through the moist zone.

Comparative Example 2

A separator for batteries was obtained in the same manner as in Example 1, except that a varnish (h) was used, prepared by mixing the fluororesin, alumina particles having an average diameter of 0.5 μm, and N-methyl-2-pyrrolidone so that the content of the alumina particles was 82% by volume with respect to the total of the fluororesin and the alumina particles and the solid concentration was 64% by weight.

Comparative Example 3

A separator for batteries was obtained in the same manner as in Example 1, except that a varnish (i) was used, prepared by mixing the fluororesin, alumina particles having an average diameter of 0.5 μm, and N-methyl-2-pyrrolidone so that the content of the alumina particles was 29% by volume with respect to the total of the fluororesin and the alumina particles and the solid concentration was 17% by weight.

Comparative Example 4

A separator for batteries was obtained in the same manner as in Example 1, except that a varnish (j) was used, prepared by using a polyvinylidene fluoride having a weight average molecular weight of 570,000, namely Solef 1015, manufactured by Solvay, in place of the fluororesin, and mixing the fluororesin and N-methyl-2-pyrrolidone at a weight ratio of 54:46.

Comparative Example 5

A separator for batteries was obtained in the same manner as in Example 1, except that a varnish (k) was used, prepared by using a polyvinylidene fluoride having a weight average molecular weight of 280,000, namely, KF polymer W #1100 (manufactured by KUREHA CORPORATION) in place of the fluororesin.

Table 1 shows the properties of the separators for batteries obtained in Examples 1 to 12 and Comparative Examples 1 to 5.

TABLE 1

| | Coating solution | Inorganic particle content* (% by volume) | Weight average molecular weight of fluororesin (×10,000) | Time of passing through moist zone (sec) | Thickness of porous membrane (μm) | Thickness of separator for batteries (μm) | Crystallinity of fluororesin (%) |
|---|---|---|---|---|---|---|---|
| Example 1 | a | 52 | 100 | 2 | 9 | 13 | 55 |
| Example 2 | b | 43 | 100 | 2 | 9 | 13 | 40 |
| Example 3 | c | 66 | 100 | 2 | 9 | 13 | 65 |
| Example 4 | d | 52 | >100 | 2 | 9 | 13 | 53 |
| Example 5 | e | 52 | >100 | 2 | 9 | 13 | 55 |
| Example 6 | f | 52 | 100 | 2 | 9 | 13 | 54 |
| Example 7 | g | 52 | 100 | 2 | 9 | 13 | 59 |
| Example 8 | a | 52 | 100 | 2 | 16 | 20 | 55 |
| Example 9 | a | 52 | 100 | 2 | 20 | 24 | 55 |
| Example 10 | a | 52 | 100 | 2 | 7 | 11 | 55 |
| Example 11 | a | 52 | 100 | 1.5 | 9 | 13 | 48 |
| Example 12 | a | 52 | 100 | 3 | 9 | 13 | 62 |
| Comparative Example 1 | a | 52 | 100 | — | 9 | 13 | 35 |
| Comparative Example 2 | h | 82 | 100 | 2 | 9 | 13 | 68 |
| Comparative Example 3 | i | 29 | 100 | 2 | 9 | 13 | 45 |
| Comparative Example 4 | j | 0 | 57 | 2 | 9 | 13 | 35 |
| Comparative Example 5 | k | 52 | 28 | 2 | 9 | 13 | 71 |

| | Various properties | | | | |
|---|---|---|---|---|---|
| | Air permeation resistance of porous membrane (sec/100 cc Air) | Air permeation resistance of separator for batteries (sec/100 cc Air) | Extent of increase in air permeation resistance (sec/100 cc Air) | Adhesiveness to electrodes (mN/10 mm) | Thermal shrinkage (%) |
| Example 1 | 240 | 272 | 32 | 350 | 10.8 |
| Example 2 | 240 | 291 | 51 | 405 | 13.1 |
| Example 3 | 240 | 267 | 27 | 255 | 9.5 |
| Example 4 | 240 | 273 | 33 | 320 | 10.5 |
| Example 5 | 240 | 272 | 32 | 380 | 11.0 |
| Example 6 | 240 | 269 | 29 | 355 | 10.5 |
| Example 7 | 240 | 276 | 36 | 360 | 10.4 |
| Example 8 | 117 | 152 | 35 | 360 | 11.3 |
| Example 9 | 100 | 133 | 33 | 370 | 12.8 |
| Example 10 | 248 | 285 | 37 | 334 | 8.6 |
| Example 11 | 240 | 273 | 33 | 368 | 12.9 |
| Example 12 | 240 | 265 | 25 | 315 | 10.1 |
| Comparative Example 1 | 240 | 365 | 125 | 425 | 15.1 |
| Comparative Example 2 | 240 | 270 | 30 | 180 | 8.1 |

TABLE 1-continued

| | | | | | |
|---|---|---|---|---|---|
| Comparative Example 3 | 240 | 318 | 78 | 395 | 15.5 |
| Comparative Example 4 | 240 | 335 | 95 | 450 | 16.8 |
| Comparative Example 5 | 240 | 280 | 40 | 185 | 8.0 |

*Inorganic particle content with respect to the total of fluororesin and inorganic particles (% by volume)

The invention claimed is:

1. A separator for batteries comprising:
a porous membrane formed of a polyolefin resin; and
a modified porous layer including a fluororesin and inorganic particles laminated on at least one side of the porous membrane,
wherein the fluororesin is consisting of a polyvinylidene fluoride-hexafluoro propylene copolymer,
a content of the particles is equal to or more than 40% by volume and less than 70% volume with respect to a total of the fluororesin and the particles,
the fluororesin has a crystallinity of equal to or more than 36% and less than 70%, and
a weight-average molecular weight (Mw) of the fluororesin is equal to or more than $0.9 \times 10^6$ and less than $1.5 \times 10^6$.

2. The separator for batteries of claim 1, the separator satisfying Formula (1):

$$20 \leq Y - X \leq 100 \quad \text{Formula (1)}$$

where X is an air permeation resistance (sec/100 cc Air) of the porous membrane, and
Y is an air permeation resistance (sec/100 cc Air) of whole of the separator for batteries (sec/100 cc Air).

3. The separator for batteries of claim 1, wherein the polyolefin porous membrane has a thickness of not more than 25 μm.

4. The separator for batteries of claim 1, wherein the inorganic particles include at least one selected from the group consisting of alumina, titania, boehmite, and barium sulfate.

5. The separator for batteries of claim 1, the separator being used as a separator for lithium ion secondary batteries.

6. The separator for batteries of claim 1, wherein the content of the particles is equal to or more than 45% by volume and less than 65% volume with respect to a total of the fluororesin and the particles.

* * * * *